Oct. 16, 1923.
A. J. RICHARDS
1,470,763
INDIVIDUAL PIE CONTAINER
Filed Aug. 5, 1922
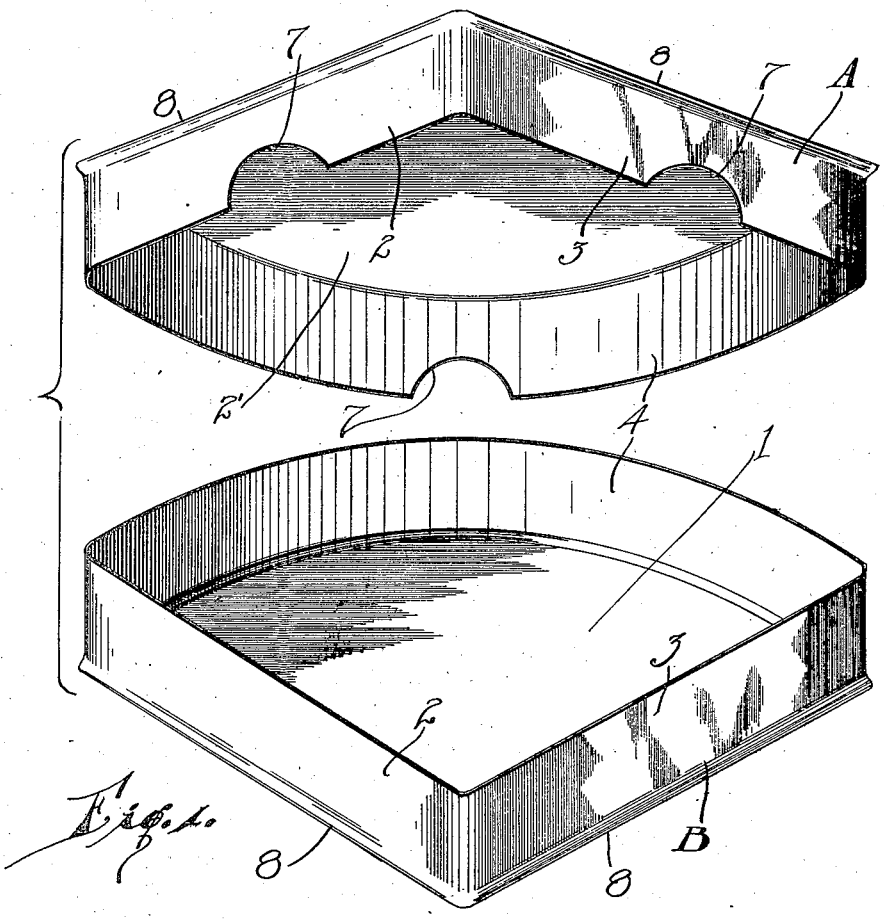
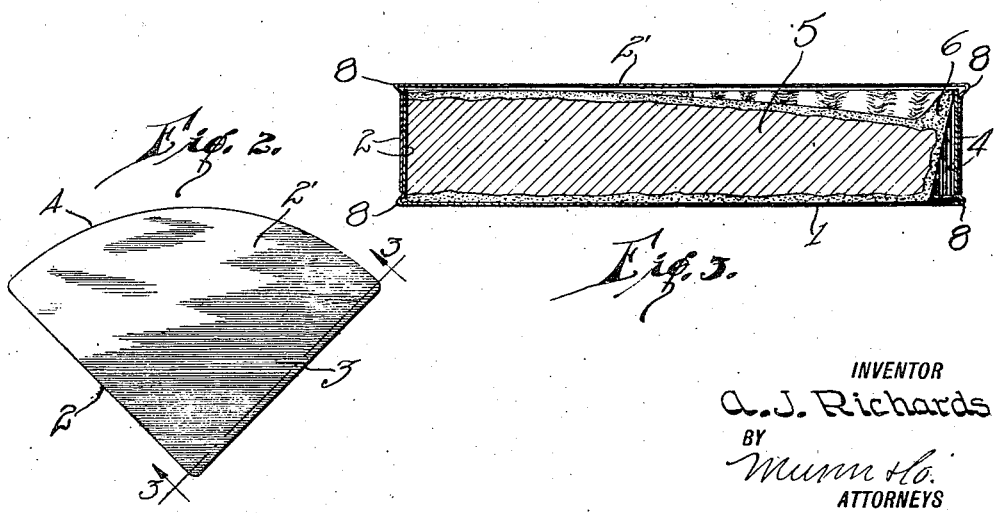
INVENTOR
A. J. Richards
BY
Munn & Co.
ATTORNEYS Patented Oct. 16, 1923.

1,470,763

UNITED STATES PATENT OFFICE.

ALEXANDER JOSEPH RICHARDS, OF CHICAGO, ILLINOIS, ASSIGNOR OF ONE-HALF TO WILLIAM H. GREUNKE, OF CHICAGO, ILLINOIS.

INDIVIDUAL PIE CONTAINER.

Application filed August 5, 1922. Serial No. 579,833.

*To all whom it may concern:*

Be it known that I, ALEXANDER JOSEPH RICHARDS, a citizen of the United States, and a resident of Chicago, in the county of Cook and State of Illinois, have invented a new and useful Improvement in Individual Pie Containers, of which the following is a full, clear, and exact description.

My invention relates to improvements in individual pie containers, and it consists in the combinations, constructions, and arrangements herein described and claimed.

An object of my invention is to provide an individual pie container which is shaped so as to closely conform to a cut piece of pie, whereby the piece of pie may be readily carried in the pocket of anyone.

A further object of my invention is to provide a device of the type described which is made of aluminum whereby the device may be readily cleaned after use.

A further object of my invention is to provide a device of the type described which is very simple in construction, and which is leak-proof, thereby holding all of the contents of the pie within the device.

Other objects and advantages will appear in the following specification, and the novel features of the invention will be particularly pointed out in the appended claim.

My invention is illustrated in the accompanying drawings forming part of this application, in which—

Figure 1 is a perspective view of the device disassembled,

Figure 2 is a plan view of the device, and

Figure 3 is a section along the lines 3—3 of Figure 2.

In carrying out my invention, I provide a pie container which is preferably made of aluminum, and which comprises two separable parts—A and B. The parts A and B are shaped so as to snugly receive the cut piece of pie. It will be noted in Figures 1 and 2 that the members A and B have triangular shaped bases 1 and 2', and vertically extending sides, 2, 3, and 4. The sides 4 are arcuate shaped, and conform to the outer edge of the piece of the pie, 5. The pie when cut is disposed within the container or member B, and has its sides abutting the sides 2 and 3. As heretofore stated, the curved end 6 of the pie 5 abuts the curved side 4. From this construction it will be apparent that the pie is snugly retained on all sides thereof.

The height of the sides 2, 3, and 4 are substantially the height of the piece of pie 5. It will therefore be apparent that when the cover or member A is disposed over the member B, the top 2 will bear against the top of the pie and thus securely hold the pie from movement with respect to the container. The members A and B are preferably stamped from single sheets of metal, the member A having recesses 7, whereby the lower container may be readily gripped so as to permit the removal of the cover A. The sides 2, 3, and 4 of each of the members closely engage with one another so as to make a water-tight closure. In this manner all of the contents of the piece of pie are retained within the container. It will therefore be apparent that the container may be readily carried in the pocket of a person without any likelihood of the contents of the device leaking out.

From the foregoing description of the various parts of the device, the operation thereof may be readily understood.

As heretofore stated, the cut piece of pie closely conforms in shape to the shape of the container, whereby the pie cannot readily move with respect to the container. In this manner, the pie is preserved more or less intact, even though the container is disposed in various positions. The height of the walls 2, 3, and 4 are substantially the height of the pie. The device would therefore not be likely to crush a piece of pie which is placed therewithin. The device is very simple in construction, and is adapted to be stamped out in large numbers. The device is neat and attractive in appearance, and when made of aluminum provides a sanitary small and compact individual pie container. The device is so small that it may be readily carried in the pocket, and does not inconvenience the person carrying the same.

It is also to be noted that the members A and B have the sides adjacent to the bases 1 and 2, curved outwardly so as to provide outwardly extending portions 8 to the bases. The extensions 8 not only enhance the appearance of the container, but provide a novel means for making the container liquid tight. The lower edges of the sides of the member A are forced slightly outward when they engage with the entension 8 of the member B, thereby assuring a more perfect contact between the sides of the members.

I claim:

An individual pie container comprising a pie retaining member having a triangular-shaped body portion with sides, said body portion having an outwardly extending bead around its entire edge and projecting beyond the sides, and a cover having a triangular-shaped body portion and sides, the sides of said cover being adapted to enclose the sides of said retaining member and to be forced outwardly by the bead to provide a liquid-tight joint.

ALEXANDER JOSEPH RICHARDS.